(12) United States Patent
Shore et al.

(10) Patent No.: US 8,637,703 B2
(45) Date of Patent: Jan. 28, 2014

(54) METHODS FOR SYNTHESIZING AMMONIA BORANE

(75) Inventors: Sheldon Gerald Shore, Columbus, OH (US); Xuenian Chen, Columbus, OH (US)

(73) Assignee: The Ohio State University, Columbus, OH (US)

( * ) Notice: Subject to any disclaimer, the term of this patent is extended or adjusted under 35 U.S.C. 154(b) by 200 days.

(21) Appl. No.: 13/158,713

(22) Filed: Jun. 13, 2011

(65) Prior Publication Data

US 2012/0014857 A1 Jan. 19, 2012

Related U.S. Application Data

(62) Division of application No. 12/295,653, filed as application No. PCT/US2007/008160 on Apr. 2, 2007, now Pat. No. 7,977,508.

(60) Provisional application No. 60/744,162, filed on Apr. 3, 2006.

(51) Int. Cl.
*C07D 265/30* (2006.01)
*C07F 5/02* (2006.01)

(52) U.S. Cl.
USPC .................................. 564/8; 546/13; 544/106

(58) Field of Classification Search
USPC .................................. 564/8; 544/106; 546/13
See application file for complete search history.

(56) References Cited

U.S. PATENT DOCUMENTS

| 4,157,927 A | 6/1979 | Chew et al. | |
| 6,060,623 A * | 5/2000 | Iwasaki | 564/8 |
| 7,977,508 B2 * | 7/2011 | Shore et al. | 564/8 |

FOREIGN PATENT DOCUMENTS

WO  WO2007/120511  10/2007

OTHER PUBLICATIONS

International Search Report from PCT/US07/08160 dated Jul. 7, 2008.
Beres et al, "Dimethyl Sulfide-Borane as a Borane Carrier", Inorganic Chemistry, vol. 10, No. 9. pp. 2072-2074, 1971.
Brown et al., "Molecular addition compounds. 9. Effect of structure on the reactivities of representative borane-amine complexes in typical reactions such as hydrolysis, hydroboration, and reduction", Inorganic Chemistry, 1984, vol. 23, pp. 2746-2753.
Brown, et al., "Molecular addition compounds. 10. Borane adducts with N, N-Dialkylanilines for hydroboration", Organometallics, 17, pp. 4202-4205, 1998.
Fakioglu et al., "A review of hydrogen storage systems based on boron and its compounds", Intl. Journal of Hydrogen Energy, vol. 29, Issue 13, Oct. 2004, pp. 1371-1376.
Hu et al., "New synthetic approaches to ammonia-borane and its deuterated derivatives", Journal Inorg Nucl Chem, vol. 39, pp. 2147-2150, vol. 39, 1977, printed Great Britain.
Jaska, et al., "Transition Metal-catalyzed formation of boron-nitrogen bonds: catalytic dehydrocoupling of amine-borane adducts to form aminoboranes and borazines", Journal American Chemical Society, 125, pp. 9424-9434, 2003.
Mayer, Erwin, "Symmetrical cleavage of diborane by ammonia in solution", Inorganic Chemistry, vol. 11, No. 4, 1972, pp. 866-869.
Narayana, et al., "A simple convenience method for the generation of diborance from NaBH4 and 12", Journal of Organometalllic Chemistry, 323, pp. 145-147, 1987, printed in The Netherlands.
T-Raissi, "Technoeconomic analysis of area II hydrogen production—part II Hydrogen from Ammonia and Ammonia-borane complex for fuel cell applications", Proceedings of the 2002, U.S. DOE Hydrogen Program Review, NREL/ CP-610-32405, pp. 1-17.
T-Raissi, "V.A. System Analysis. V.A. 1 Analysis of hydrogen production using ammonia and amonia-borane complex for fuel cell applications", Hydrogen, Fuel Cells, and Infrastructure Technologies, FY 2002 Progress Report, pp. 537-542.
Reetz, Theodor, "Hexaalkyl phosphorous triamide borines", vol. 82, pp. 5036-5039, Journal American Chemical Society, 1960.
Shore et al., "The crystalline, compound ammonia-borane, H3NBH2", Communications to the Editor, vol. 77, pp. 6084-6085, Nov. 20, 1955.
Shore et al., "Large Scale Synthesis of H2B(NH3)2+BH2 and H3NBH3", Inorganic Chemistry, vol. 3, No. 6, pp. 914-915, 1964.
Shore, et al., "Diamminedihydroboron (1+) tetrahydroborate (Diammoniate of Diborane)", Inorganic Systhesis, vol. 9, copyright 1967, pp. 4-8.
Solomons, T.W., "Organic Chemistry", Third Edition, John Wiley & Sons, copyright 1984, printed U.S., cover pages pp. 834-841 and 878-879.
Supplementary European Search Report and Search Opinion from European Application No. 07754652.1 dated Apr. 28, 2011.

* cited by examiner

*Primary Examiner* — Golam M M Shameem
(74) *Attorney, Agent, or Firm* — Calfee Halter & Griswold LLP

(57) ABSTRACT

Methods of synthesizing ammonia borane are provided. The methods comprise reacting at least one amine borane with ammonia such that ammonia borane is produced. Ammonia borane has a chemical formula of $NH_3.BH_3$ and provides a good source of storage hydrogen making it useful in a variety of applications including a potential hydrogen source for fuel cells. The methods can further comprise separating the ammonia borane from the other products of the reaction. Exemplary methods can produce ammonia borane having purity greater than about 90 percent. In further examples, the methods can produce ammonia borane having purity greater than about 95 percent or greater than about 99 percent.

12 Claims, 21 Drawing Sheets

METHODS FOR SYNTHESIZING AMMONIA BORANE

CROSS-REFERENCE TO RELATED APPLICATIONS

This application is a divisional of U.S. patent application Ser. No. 12/295,653, entitled "METHODS FOR SYNTHESIZING AMMONIA BORANE," filed Oct. 1, 2008, which claims priority to International Application Serial No. PCT/US07/08160, filed Apr. 2, 2007, which claims priority from U.S. provisional application Ser. No. 60/744,162, filed on Apr. 3, 2006 which are fully incorporated herein by reference in their entirety.

BACKGROUND

Ammonia borane can provide a good source of storage hydrogen because it contains 19.6% hydrogen. Such a source of storage hydrogen can be useful in a variety of applications. For example, storage hydrogen can be used in vehicular fuel cells with the appropriate reformer. Currently, methods to produce ammonia borane can be very costly and difficult to scale to industrial production. There remains a need in the art for improved methods of producing ammonia borane.

SUMMARY

In accordance with embodiments of the present invention, methods of synthesizing ammonia borane are provided. The methods can comprise reacting at least one of an amine borane with ammonia such that ammonia borane is produced. The amine borane can be selected from at least one of an amine borane having a structure selected from at least one of:

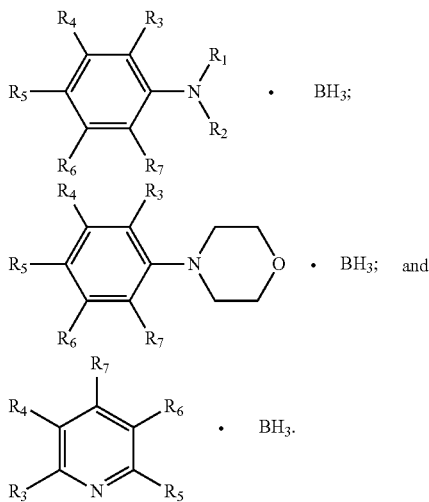

wherein:

$R_1$ and $R_2$ comprise H or a substituted or unsubstituted, saturated or unsaturated, aromatic or nonaromatic $C_1$-$C_{10}$ alkyl; and $R_3$-$R_7$ comprise H, Cl, F, $NO_2$, $OR_8$, or a substituted or unsubstituted, saturated or unsaturated, aromatic or nonaromatic $C_1$-$C_{10}$ alkyl, except that when the amine borane is

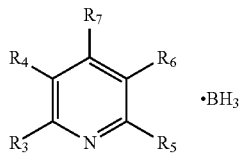

$R_3$-$R_7$ cannot each be H;

$R_8$ comprises H or a substituted or unsubstituted, saturated or unsaturated, aromatic or nonaromatic $C_1$-$C_{10}$ alkyl.

In some examples, the amine borane is selected from dimethylaniline borane, diethylaniline borane, phenylmorpholine borane, and lutidine borane. In other examples, the amine borane comprises dimethylaniline borane. In further examples, the methods can further comprise providing the at least one of the amine borane in a solvent prior to the step of reacting the at least one of the amine borane. In some instances, the solvent is selected from at least one of toluene, heptane, and xylenes.

In some embodiments, the step of reacting the at least one of the amine borane comprises providing the ammonia as a gas and bubbling the ammonia gas through the solution such that ammonia borane is produced. In other embodiments, the methods further comprising separating the ammonia borane from other reactant products and the solvent after the step of reacting the at least one of the amine borane. In some instances, the methods further comprise reacting the other reactant products in the solvent to produce an amine borane and reacting said amine borane produced from said other reactant products with ammonia to form ammonia borane.

In further examples, the ammonia borane separated from other reactant products has a purity greater than about 90 percent, or about 95 percent, or about 99 percent. In other examples, the step of reacting the at least one amine borane provides a yield of ammonia borane that is greater than about 85 percent or greater than about 95 percent.

In some embodiments, methods of synthesizing ammonia borane are provided. The methods comprise reacting dimethylaniline with ammonia gas such that ammonia borane is produced. The methods can further comprise providing the dimethylaniline in a solvent prior to the step of reacting dimethylaniline. In some examples, the ratio of the solvent to the dimethylaniline is about 1:1. In further examples, the solvent is selected from at least one of toluene, heptane and xylenes.

It will be understood that these embodiments are exemplary only and do not limit the scope of the invention.

BRIEF DESCRIPTION OF THE SEVERAL VIEWS OF THE DRAWINGS

The following detailed description of embodiments of the present invention can be best understood when read in conjunction with the following drawings, where like structure is indicated with like reference numerals and in which.

DETAILED DESCRIPTION OF EMBODIMENTS OF THE INVENTION

Figure 1:
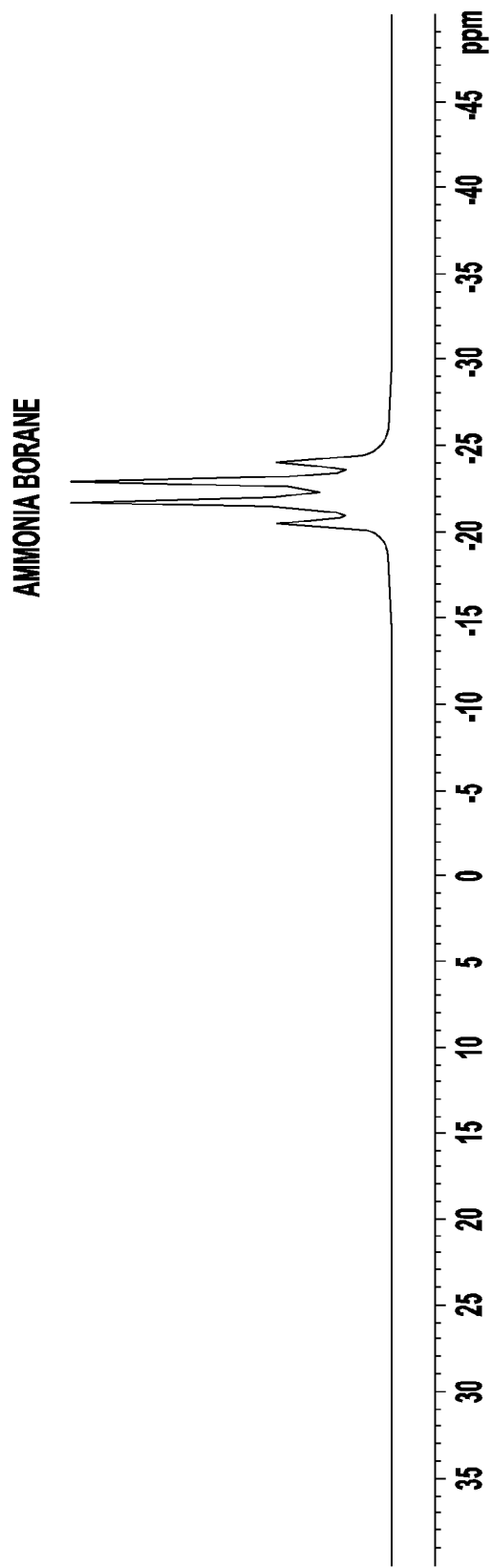
FIG. 1 is a $^{11}$B NMR spectrum of ammonia borane.
Figure 2:
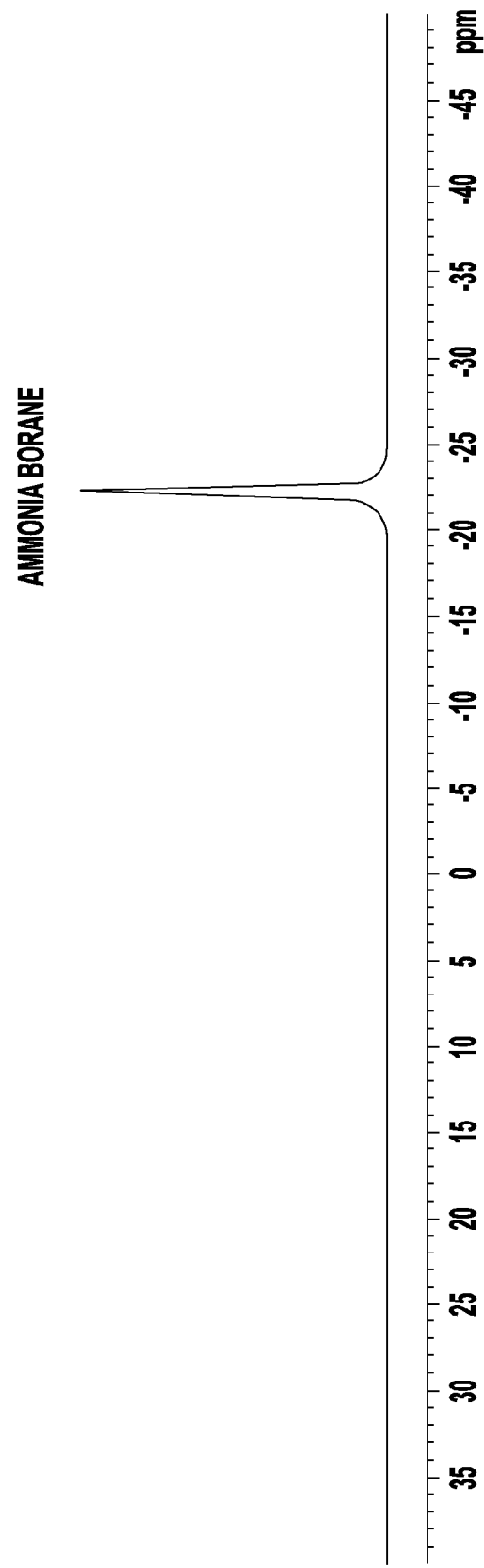
FIG. 2 is a $^{11}$B{$^1$H} NMR spectrum of ammonia borane.
Figure 3:
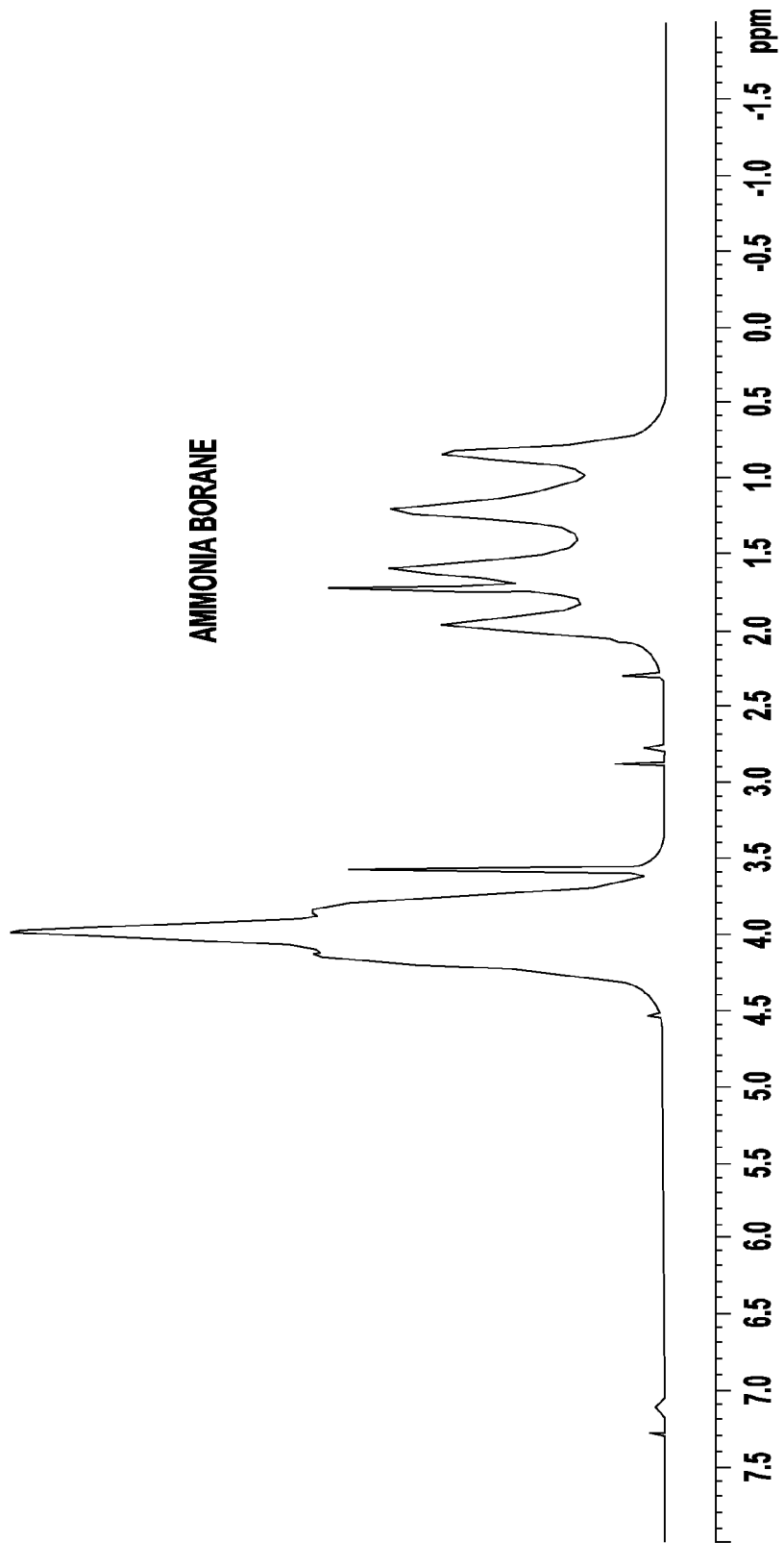
FIG. 3 is a $^1$H NMR spectrum of ammonia borane.
Figure 4:
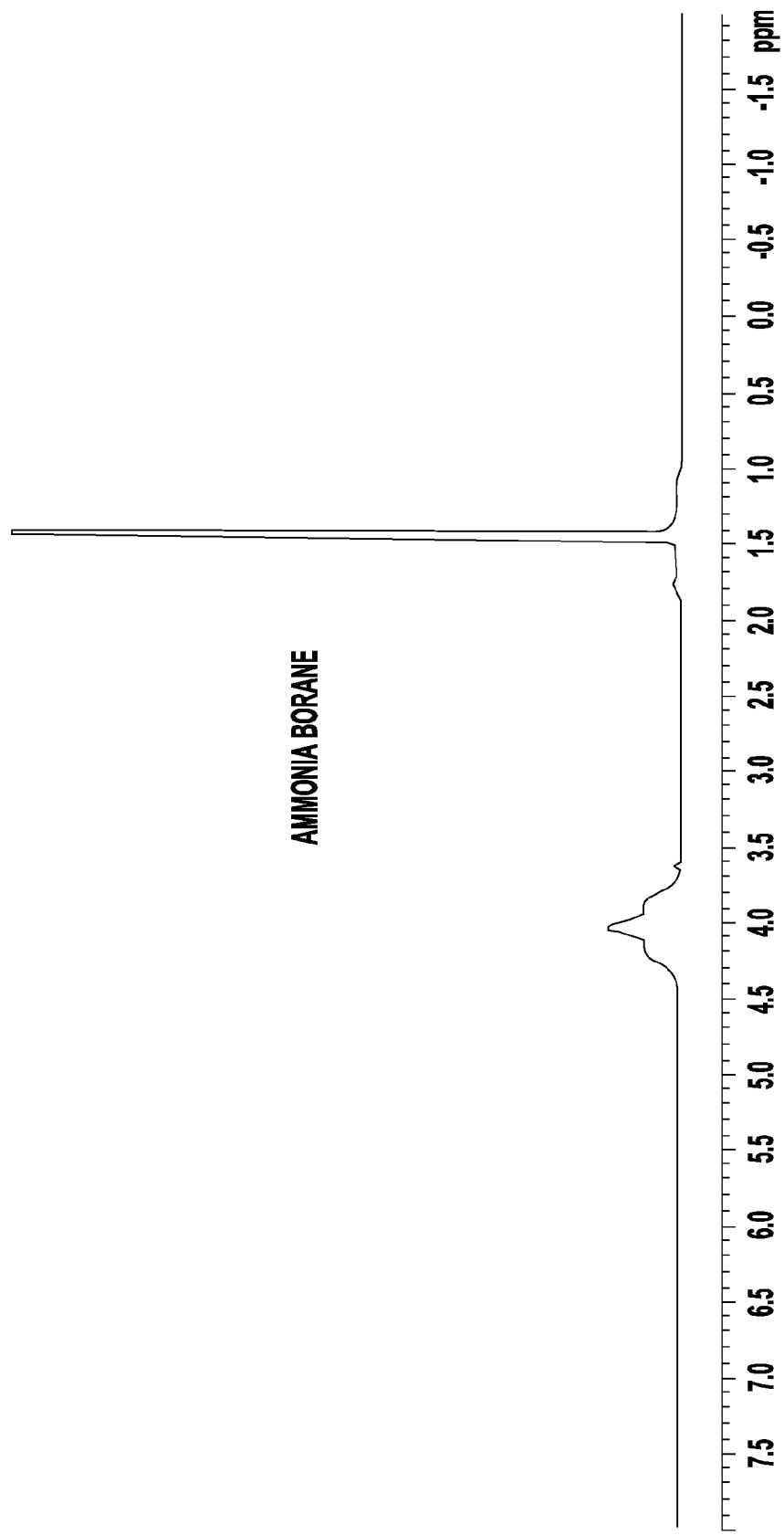
FIG. 4 is a $^1$H{$^{11}$B} NMR spectrum of ammonia borane.

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are incorporated by reference in their entirety.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

Methods of synthesizing ammonia borane are provided. Ammonia borane has a chemical formula of $NH_3 \cdot BH_3$. Ammonia borane can be useful in a variety of applications. For example, ammonia borane may be useful as a hydrogen source for fuel cells.

In accordance with embodiments of the present invention, methods of synthesizing ammonia borane are provided. The methods comprise reacting at least one amine borane with ammonia such that ammonia borane is produced. In some examples, the amine borane can have a structure selected from at least one of:

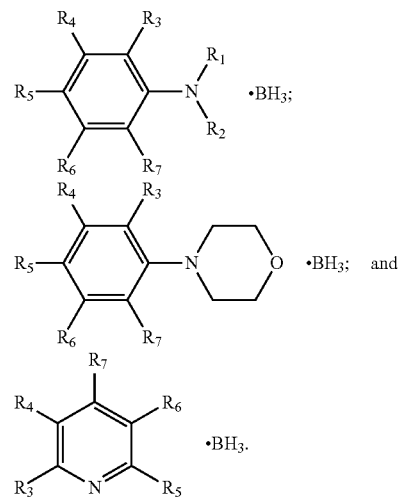

wherein:

$R_1$ and $R_2$ comprise H or a substituted or unsubstituted, saturated or unsaturated, aromatic or nonaromatic $C_1$-$C_{10}$ alkyl;

$R_3$-$R_7$ comprise H, Cl, F, $NO_2$, $OR_8$, or a substituted or unsubstituted, saturated or unsaturated, aromatic or nonaromatic $C_1$-$C_{10}$ alkyl, except that when the amine borane is

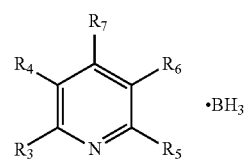

$R_3$-$R_7$ cannot each be H; and $R_8$ comprises H or a substituted or unsubstituted, saturated or unsaturated, aromatic or nonaromatic $C_1$-$C_{10}$ alkyl.

In some examples, $R_1$ and $R_2$ can comprise a substituted or unsubstituted, saturated or unsaturated, aromatic or nonaromatic $C_1$-$C_6$ alkyl. In other examples, $R_3$-$R_7$ can comprise a substituted or unsubstituted, saturated or unsaturated, aromatic or nonaromatic $C_1$-$C_6$ alkyl. In further examples, $R_8$ can comprise a substituted or unsubstituted, saturated or unsaturated, aromatic or nonaromatic $C_1$-$C_6$ alkyl.

In some examples, the amine borane can be selected from at least one of aniline borane, N-methylaniline borane, N,N-dimethylaniline borane, N-ethylaniline borane, N,N-diethylaniline borane, N-benzylaniline borane, N,N, dibenzylaniline borane, p-toluidine borane, m-toluidine borane, o-toluidine borane, p-chloroaniline borane, m-chloroaniline borane, o-chloroaniline borane, p-anisidine borane, m-anisidine borane, o-anisidine borane, p-nitroaniline borane, m-nitroaniline borane, o-nitroaniline borane, lutidine borane, p-fluoroaniline borane, m-fluoroaniline borane, o-fluoroaniline borane, 2-chloro-4-aminotoluene borane, diphenylamine borane, and N-phenylmorpholine borane. It will be understood that a single amine borane or more than one amine borane can be used in the methods of the present invention. It will also be understood that the amine boranes can be from any suitable source. The amine boranes can be purchased or synthesized. Such synthesis methods will be understood by those having skill in the art. For example, amine boranes can be synthesized in accordance with the procedures provided in Example 3 or Example 4.

Examples of suitable reaction schemes include the schemes illustrated below.

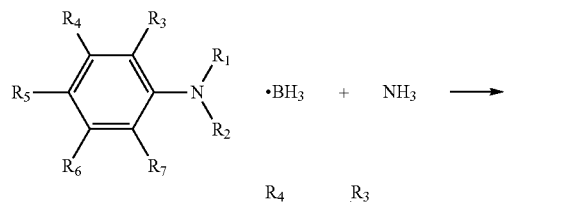

Scheme 1

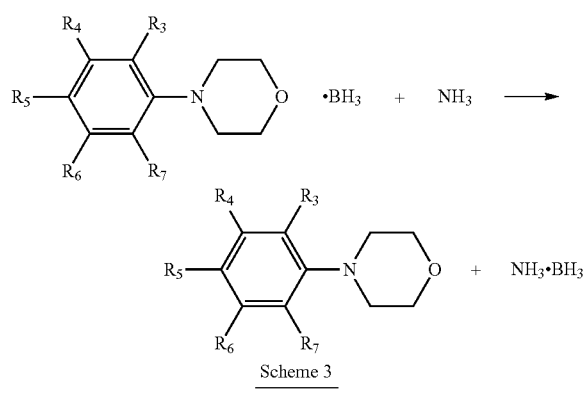

Scheme 2

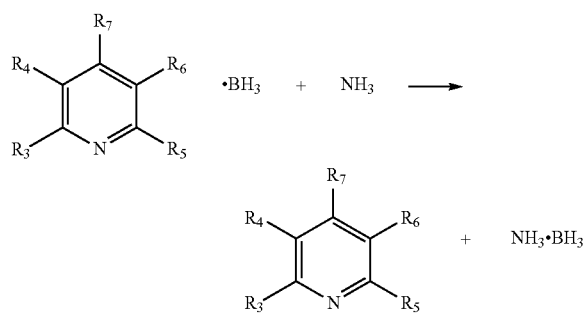

Scheme 3

For example, dimethylaniline borane can be reacted with ammonia to produce ammonia borane as shown below.

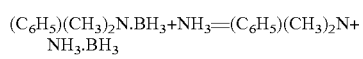

$(C_6H_5)(CH_3)_2N.BH_3 + NH_3 = (C_6H_5)(CH_3)_2N + NH_3.BH_3$

In other examples, diethylaniline borane, phenylmorpholine borane or lutidine borane can be reacted with ammonia to form diethylaniline and ammonia borane, phenylmorpholine and ammonia borane, or lutidine and ammonia borane.

In some examples, the ammonia is provided in the form of ammonia gas that is bubbled through the amine borane. The methods can further comprise separating the ammonia borane from the other products of the reaction, such as the amine product, after the step of reacting the amine borane complex. It will be understood that this separation can be performed in any suitable manner. For example, the separation can be performed by filtering the ammonia borane solid from the other reactant products and washing and subsequently drying the ammonia borane. In other embodiments, the methods further comprise using the other products of the reaction, such as the amine product, to produce an amine borane. The amine borane is further reacted with ammonia to form ammonia borane and an amine product. This recycling of the amine product can be performed for more than one reaction cycle. It is believed that this recycling of the amine product in the reaction cycle can increase the yield of ammonia borane.

In some examples, the methods further comprise providing the amine borane in a solvent prior to the step of reacting the amine borane with the ammonia. It will be understood that any suitable solvent may be used. Examples of suitable solvents include, but are not limited to toluene, heptane, and xylenes. The solvent can be provided in any suitable amount. For example, the solvent to amine borane complex ratio can be between about 10:1 to a 0:1. In some examples, the solvent can comprise toluene, heptane, or xylenes, and the amine borane can comprise dimethylaniline borane, diethylaniline borane, phenylmorpholine borane, or lutidine borane. In these examples, the ratio of the solvent to the complex can be about 1:1.

In other examples, the methods can further comprise separating the ammonia borane from the amine product and the solvent after the step of reacting the amine borane with ammonia. For example, the ammonia borane can be separated from the amine and the solvent by filtration. In embodiments of the present invention, the methods can further comprise recycling the other products, such as the amine product, and the solvent after the ammonia borane has been removed by using the other products and the solvent to produce the amine borane reactant. This amine borane and solvent solution are then reacted with ammonia to produce ammonia borane, as discussed above. It is believed that the recycling of the amine product and solvent can improve the yield of the ammonia borane. It understood that the amine product and solvent can be reused numerous times in the reaction cycle.

In some examples the methods can produce ammonia borane having a purity greater than about 90 percent. In further examples, the methods can produce ammonia borane having a purity greater than about 95 percent or greater than about 99 percent. For example, the reaction of dimethylaniline in toluene with ammonia gas can produce ammonia borane having a purity of greater than about 99 percent. In some examples, the amine borane may additionally react with water in the atmosphere to produce boric acid, however this side reaction may be controlled by appropriate selection of amine boranes, solvents, and/or the solvent to amine borane ratios. For example, dimethylaniline in a heptane, toluene, or xylenes solvent with a ratio of solvent to the complex of about 1:1 minimizes such a reaction. In some examples, the methods can produce yields of ammonia borane of greater than about 85 percent. In other examples, the methods can produce yields of ammonia borane of greater than about 95 percent.

The present invention will be better understood by reference to the following examples which are offered by way of illustration not limitation.

Example 1

Synthesis of Ammonia Borane from Dimethylaniline Borane and Ammonia

Ammonia gas was bubbled through a solution of 30 ml dimethylaniline borane (contained 70 mmol borane) in 30 ml toluene until all of the dimethylaniline was consumed. The reaction proceeded according to the following scheme:

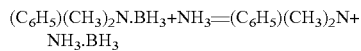

$(C_6H_5)(CH_3)_2N \cdot BH_3 + NH_3 = (C_6H_5)(CH_3)_2N + NH_3 \cdot BH_3$

The reaction was monitored by $^{11}B$ NMR spectrum. Then removal of dimethylaniline and toluene was performed by filtering the white solid ammonia borane, which was washed three times by toluene. The product was dried under vacuum with a yield of 92%. Elemental analysis: Calc for $NH_3BH_3$: N: 45.38; H: 19.59; C: 0.0; Found, N: 44.87; H: 19.46; C: less than 0.5. The NMR spectra of product ammonia borane are shown in FIGS. 1 to 4.

Example 2

Figure 5:
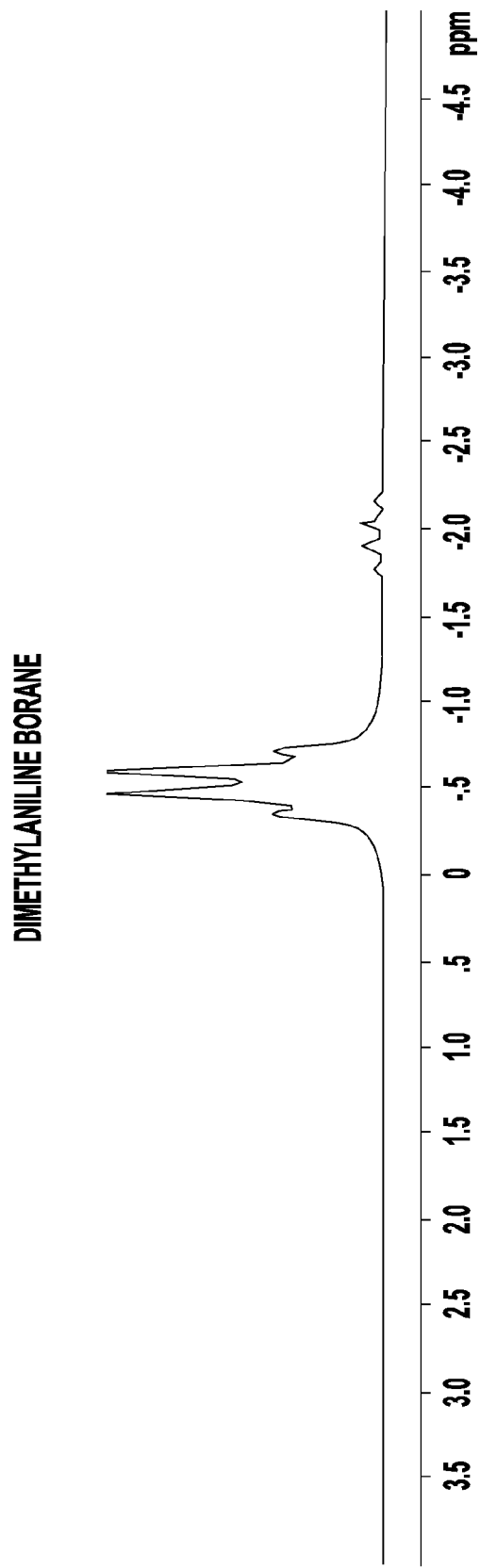
FIG. 5 is a $^{11}$B NMR spectrum of dimethylaniline borane.
Figure 6:
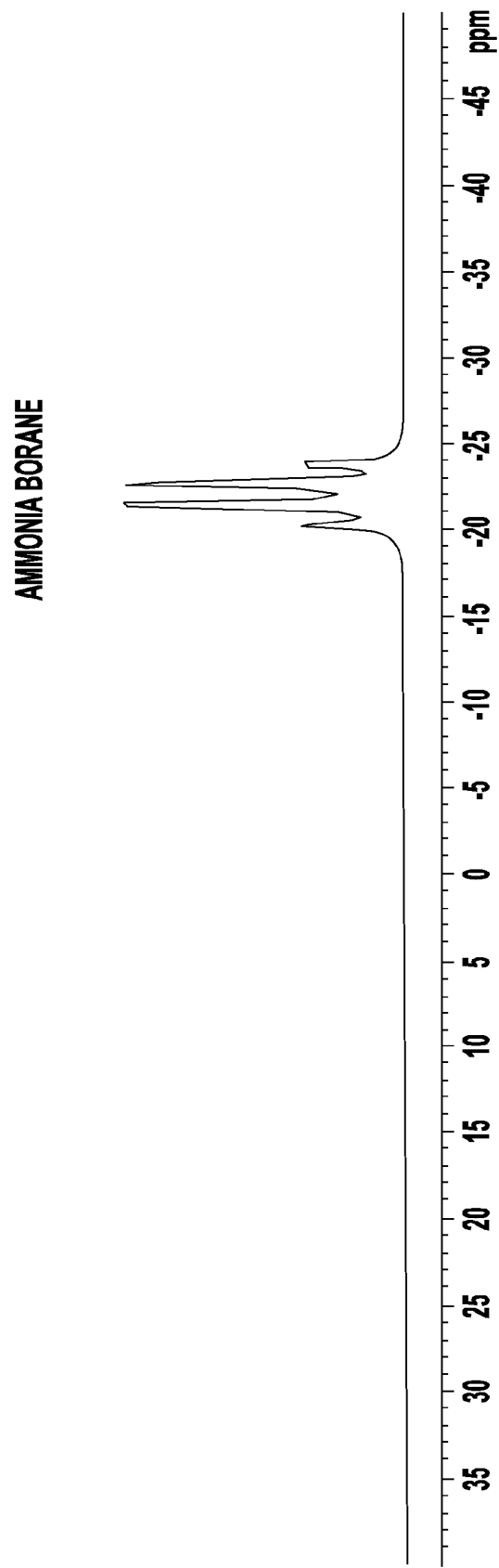
FIG. 6 is a $^{11}$B NMR spectrum of ammonia borane.
Figure 7:
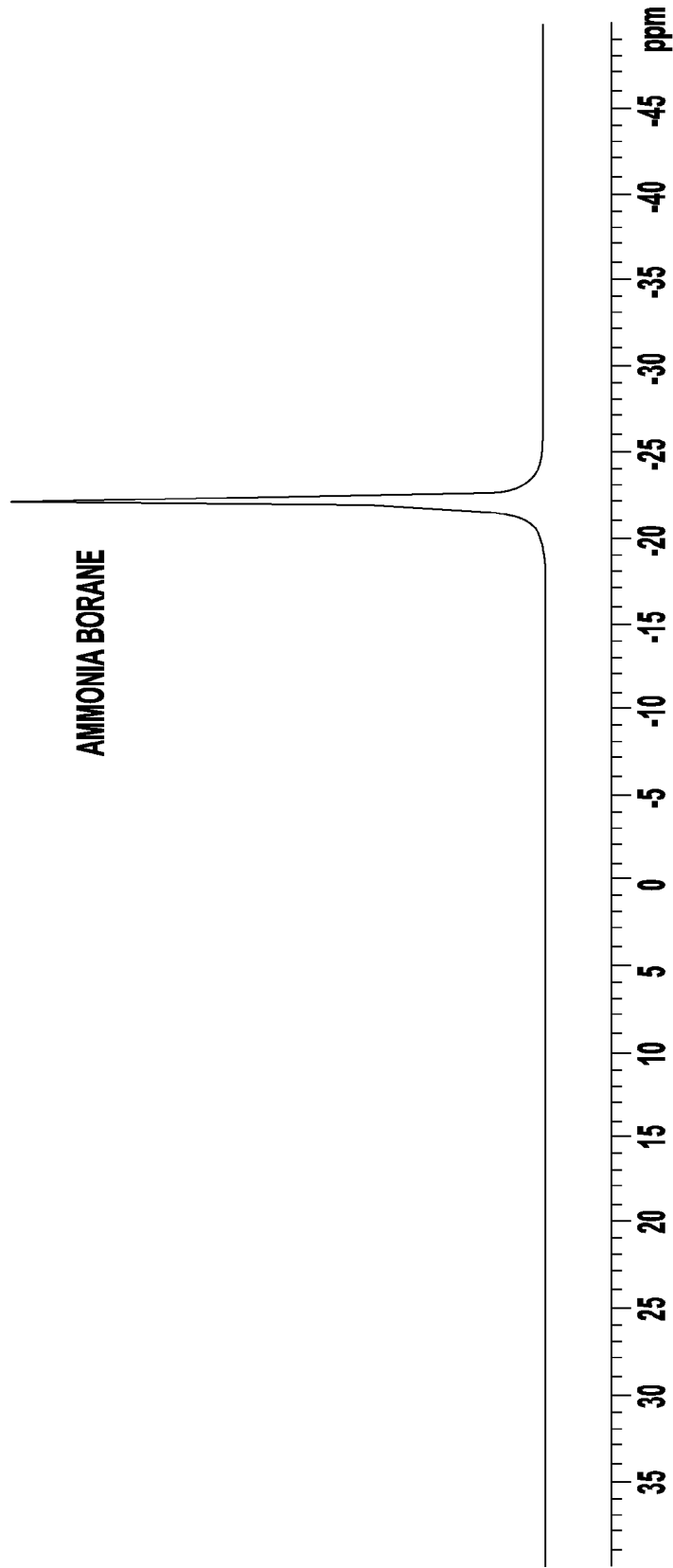
FIG. 7 is a $^{11}$B{$^1$H} NMR spectrum of ammonia borane.
Figure 8:
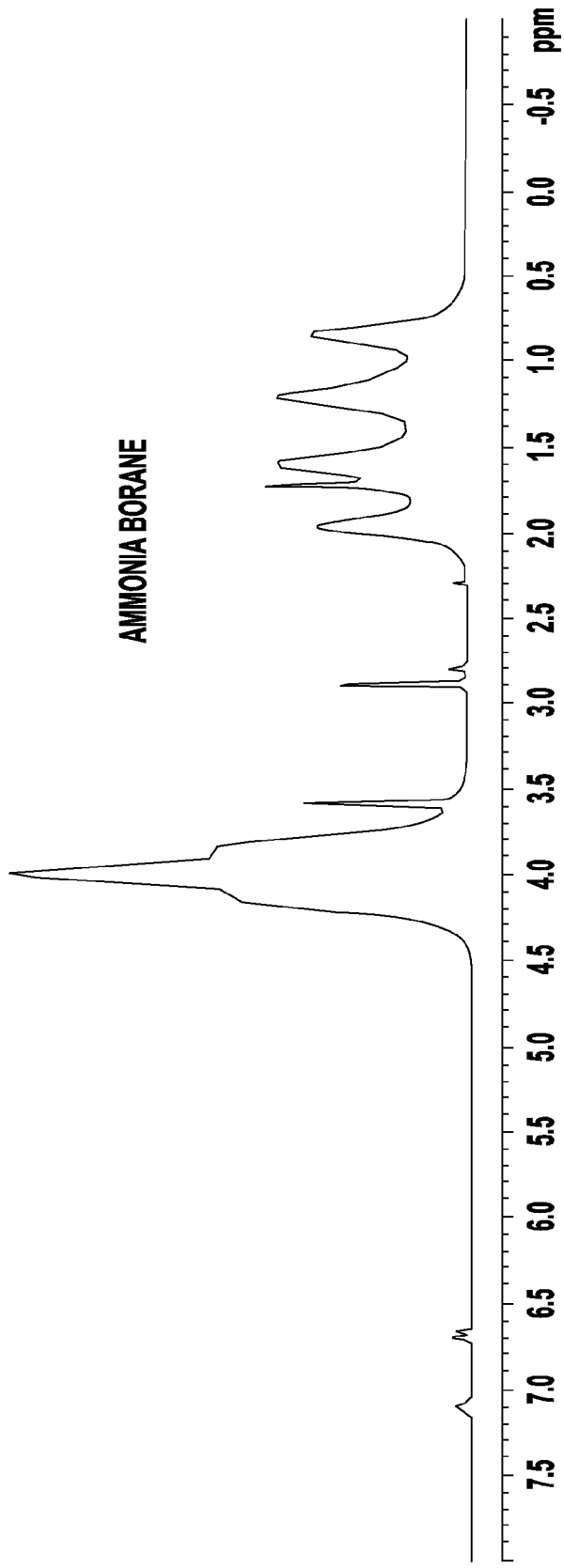
FIG. 8 is a $^1$H NMR spectrum of ammonia borane.
Figure 9:
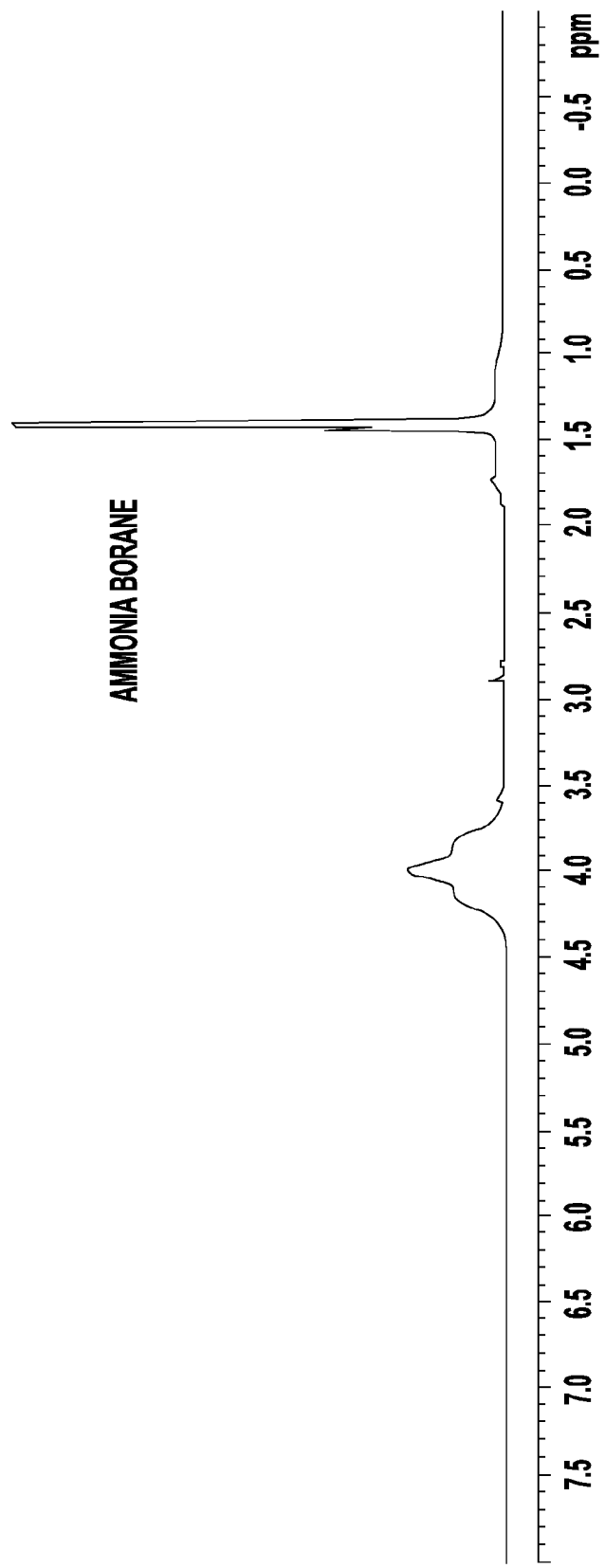
FIG. 9 is a $^1$H{$^{11}$B} NMR spectrum of ammonia borane.
Figure 10:
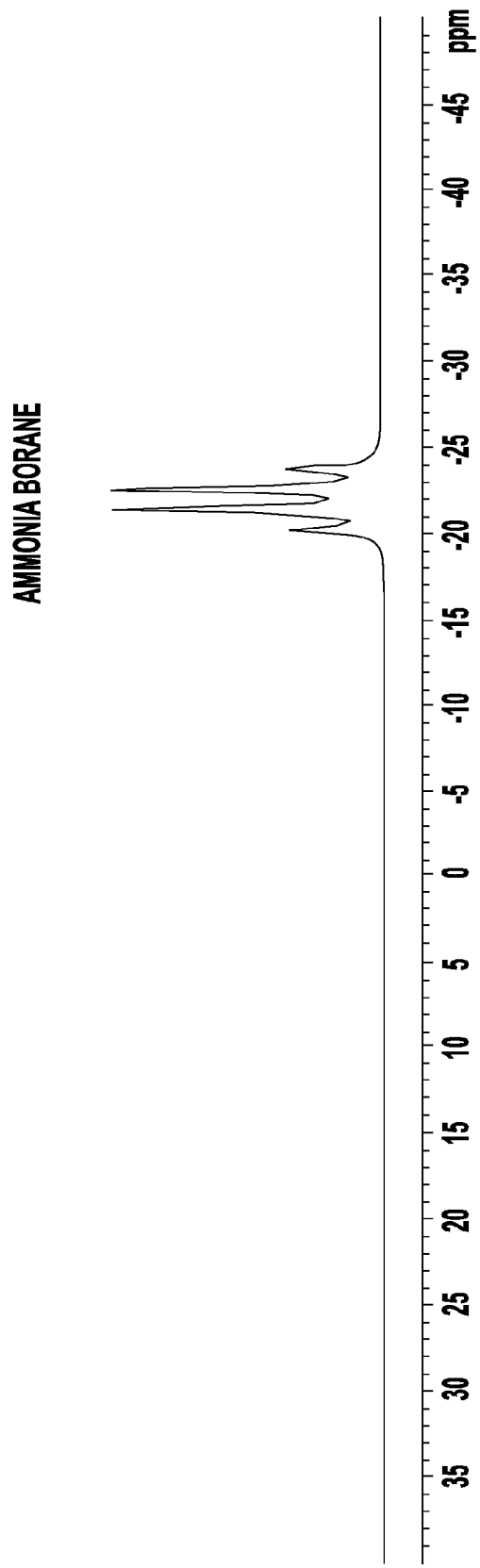
FIG. 10 is a $^{11}$B NMR spectrum of ammonia borane from second time recycling used dimethylaniline and solvent toluene.

Synthesis of Ammonia Borane from Dimethylaniline Borane and Ammonia and Further Confirmation of the Dimethylaniline and Toluene can be Used Repeatedly A 30 ml sample of dimethylaniline (236 mmol, excess 12%) was added dropwise to 20 ml dimethyl sulfide borane (210 mmol) stirring at room temperature. The solution was heated to 40° C. to evaporate dimethyl sulfide (b. p. 38° C.) to generate a dimethylaniline borane solution. The $^{11}B$ NMR of this solution shown in FIG. 5. Then 30 ml toluene was mixed with the above solution and ammonia was bubbled through the mixture until all borane was converted to ammonia borane. The reaction was monitored by $^{11}B$ NMR spectra. Then removal of dimethylaniline and toluene was performed by filtering the white solid ammonia borane, which was washed three times by toluene. The product was dried under vacuum with a yield of 90%. The NMR spectra of product ammonia borane are shown in FIGS. 6 to 9. The above filtrate solution was added dropwise to 20 ml of dimethyl sulfide borane (210 mmol) under stirring at room temperature. And then the above operation was repeated to produce ammonia borane with a yield 99%. The $^{11}B$ NMR spectrum of the product ammonia borane are shown in FIG. 10.

Example 3

Preparation of Dimethylaniline Borane from Dimethyl Sulfide Borane

Dimethylaniline borane was prepared from dimethyl sulfide borane in accordance with the following scheme:

Figure 11:
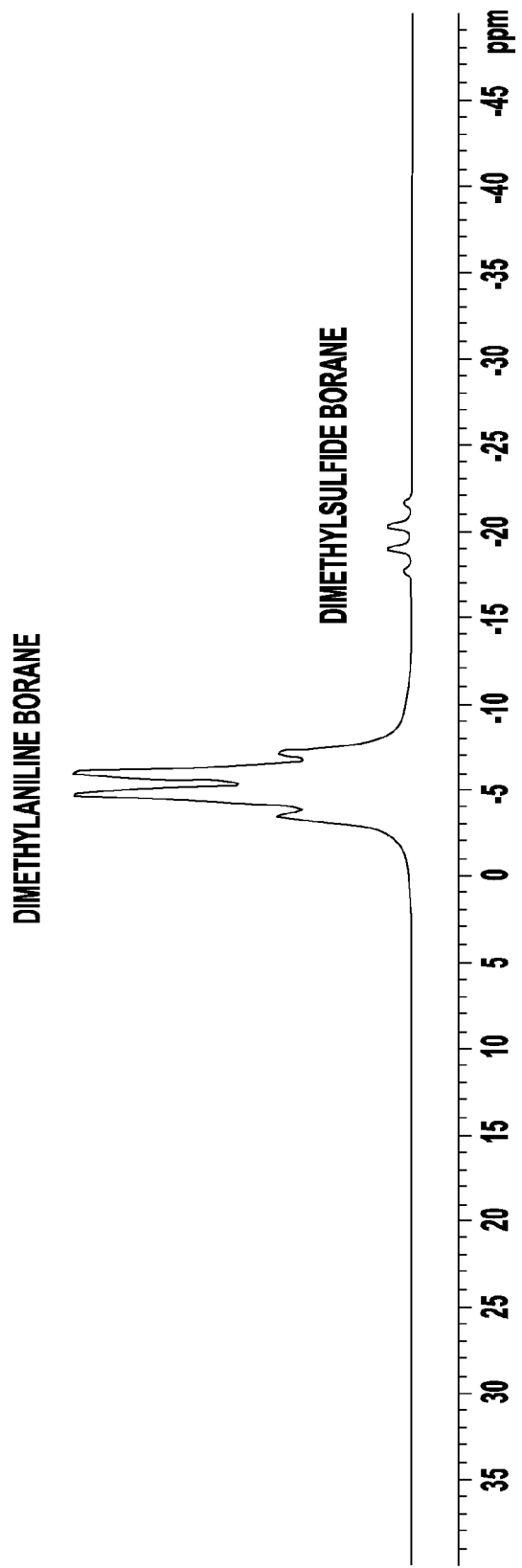
FIG. 11 is a $^{11}$B NMR spectrum of dimethylaniline borane.

$(CH_3)_2S \cdot BH_3 + (C_6H_5)(CH_3)_2N = (C_6H_5)(CH_3)_2N \cdot BH_3 + (CH_3)_2S$ A 15 ml dimethylaniline (118 mmol, excess 12%)) was added dropwise to a 10 ml dimethyl sulfide borane (105 mmol) under stirring at room temperature. Then the solution was heated to 40° C. to evaporate dimethyl sulfide (b.p. 38° C.) to generate a dimethylaniline borane solution. The $^{11}B$ NMR showed that a small amount of dimethyl sulfide borane was left in system (see FIG. 11).

Example 4

Preparation of Dimethylaniline Borane from Diborane

Dimethylaniline borane was prepared from diborane in accordance with the following scheme:

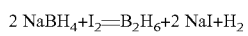

$2\ NaBH_4 + I_2 = B_2H_6 + 2\ NaI + H_2$

$B_2H_6 + 2\ (C_6H_5)(CH_3)_2N = 2\ (C_6H_5)(CH_3)_2N \cdot BH_3$

Figure 12:
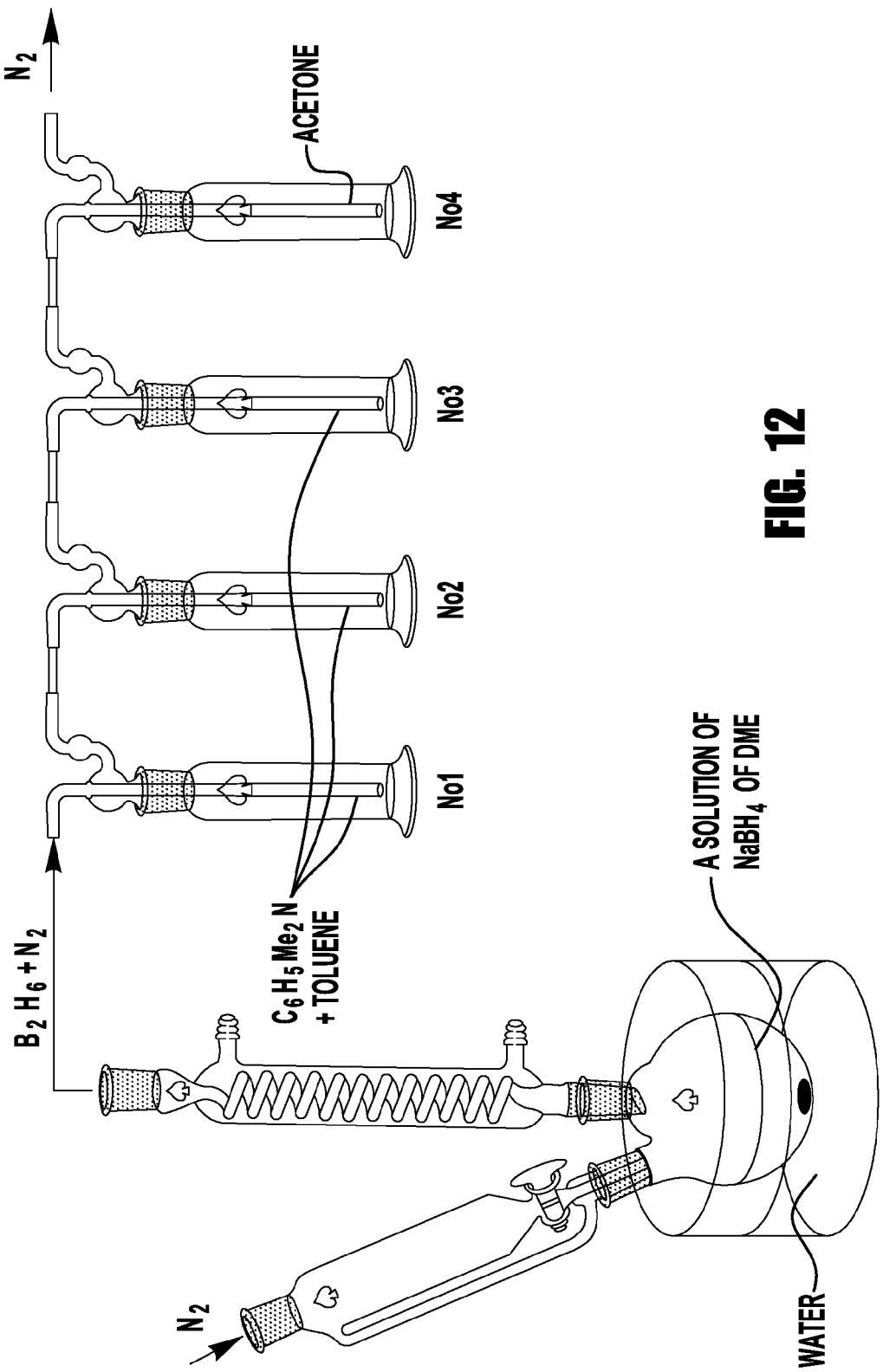
FIG. 12 illustrates an apparatus for used in the preparation of dimethylaniline borane.
Figure 13:
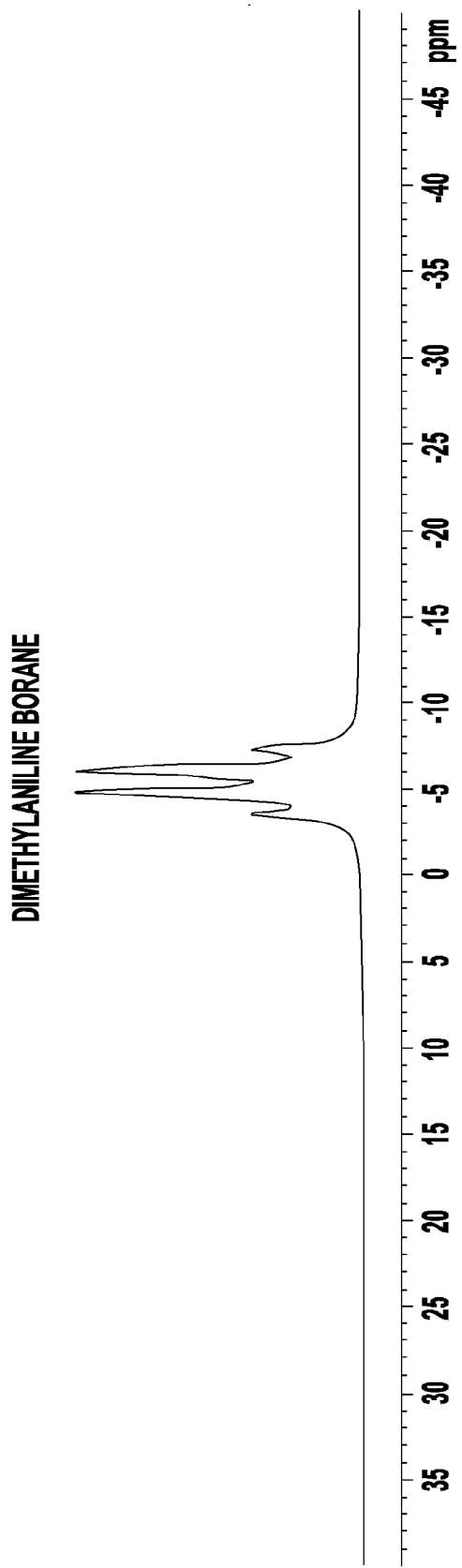
FIG. 13 is a $^{11}$B NMR spectrum of dimethylaniline borane.
Figure 14:
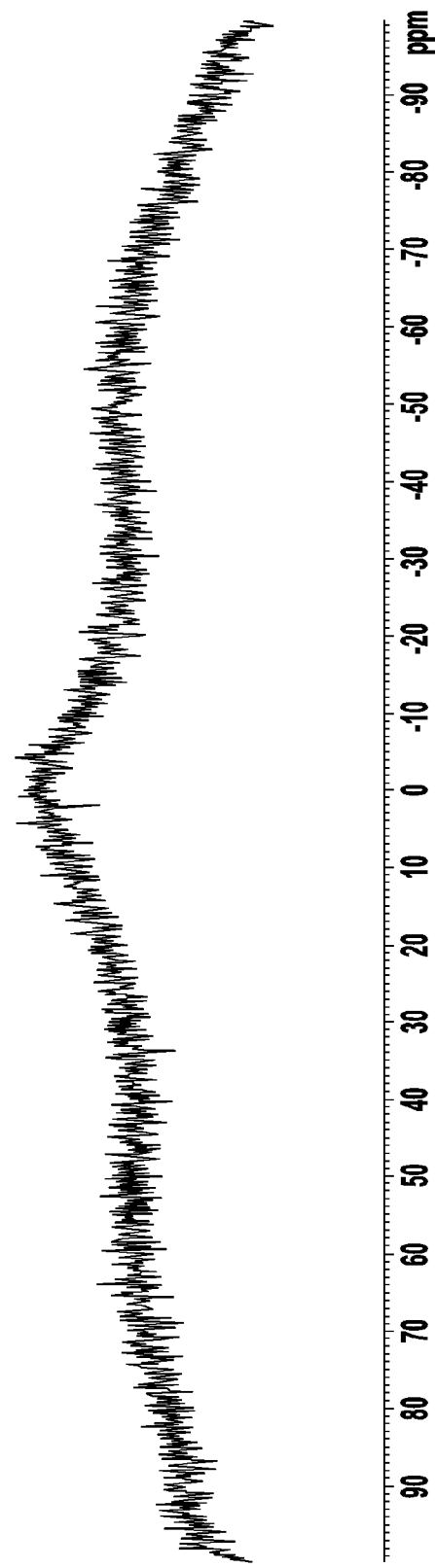
FIG. 14 is a $^{11}$B NMR spectrum of a portion of the product in flask No. 2 in the apparatus illustrated in FIG. 6.

A solution of 12.7 g iodine (50 mmol) in 50 ml DME (dimethoxyethane) was added dropwise during 1 hour to a reactor flask containing 3.8 g $NaBH_4$ (100 mmol) in 50 ml DME at room temperature with nitrogen at atmospheric pressure flowing through the system. FIG. 12 illustrates the apparatus used to carry out the preparation. The diborane and hydrogen produced in the reaction were carried on the stream of nitrogen into flask No 1 which contained a solution of 15 ml N,N-dimethylaniline (118 mmol, 18% excess) in 15 ml toluene at a water bath under stirring, to produce dimethylaniline borane. The nitrogen flowed through flask No 1 into flask No 2 and then through flask No. 3, carrying with it any unreacted diborane. The contents of flasks No 2 and No 3 were identical with that of flask No 1. The nitrogen then flowed into flask No 4 which contained acetone that destroyed any unreacted diborane that might have passed through flasks Nos. 1, 2, and 3. The outlet from the flask No. 4 was vented through a mercury bubbler. The yield of reaction produced diborane in about 70%. The reaction proceeded at close to 100%. The $^{11}B$ NMR spectrum of the solution of dimethylaniline borane in toluene in flask No. 1 is shown in FIG. 13. The $^{11}B$ NMR spectrum shown in FIG. 14 reveals that no diborane was carried into flask No 2.

Example 5

Effect of Solvents on the Reaction of Dimethylaniline Borane with Ammonia

Figure 15:
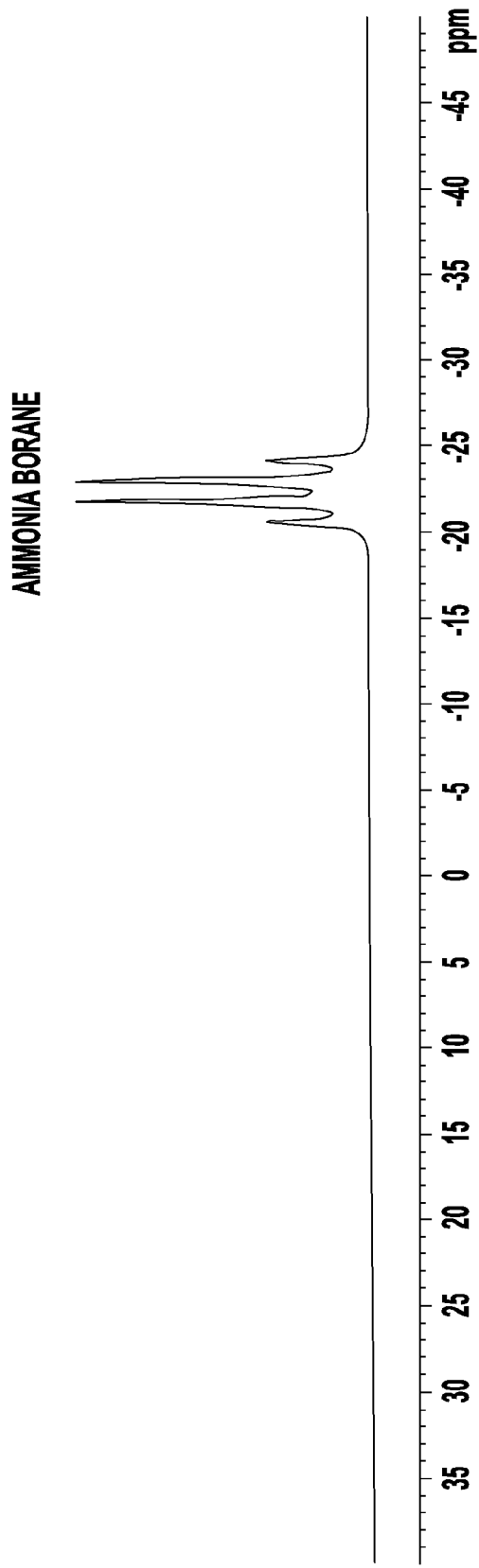
FIG. 15 is a $^{11}$B NMR of ammonia borane prepared by using heptane as a solvent.
Figure 16:
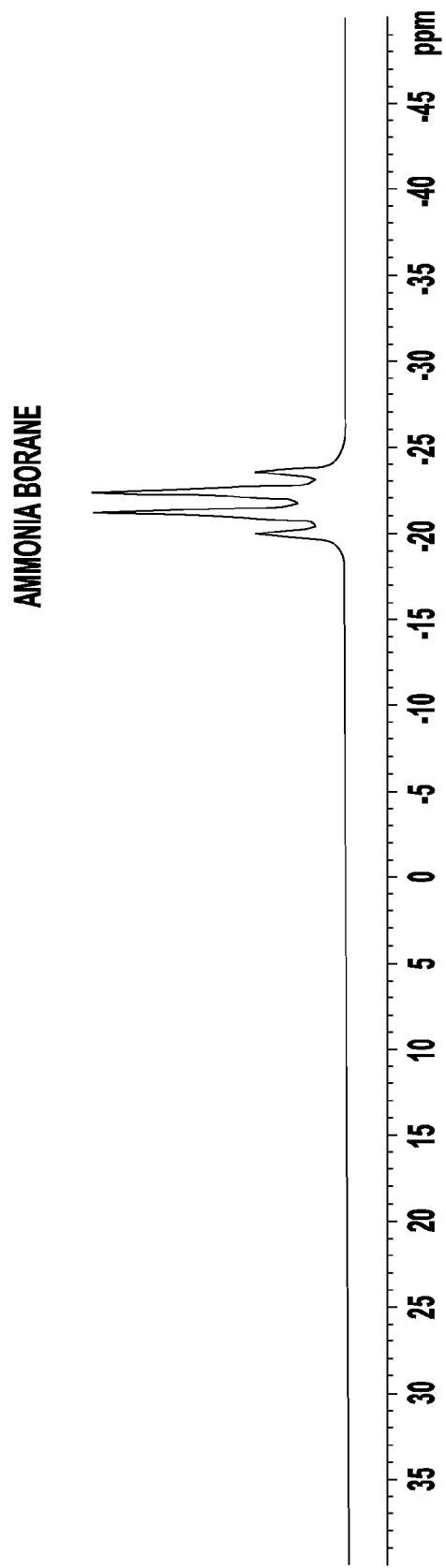
FIG. 16 is a $^{11}$B NMR of ammonia borane prepared by using xylenes as a solvent.
Figure 17:
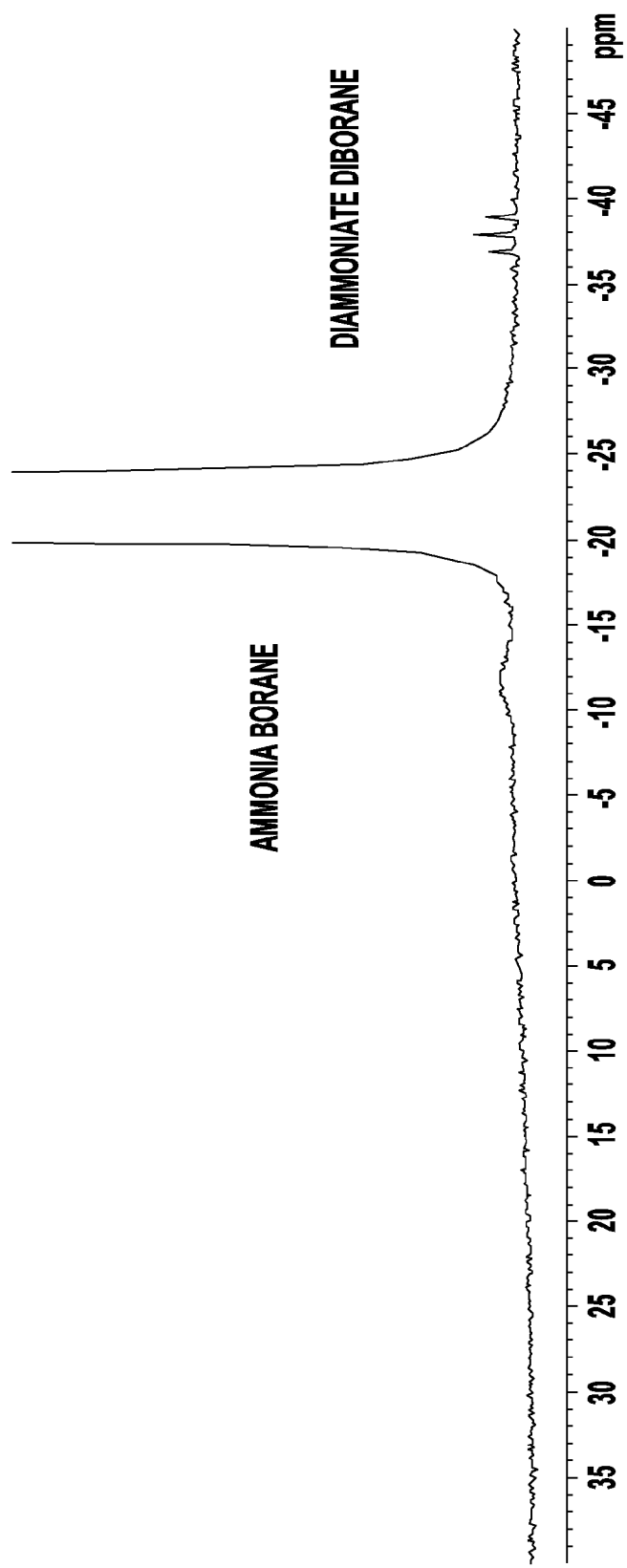
FIG. 17 is a $^{11}$B NMR of ammonia borane prepared by using petroleum ethers as a solvent.

Four solvents, toluene, heptane, xylenes, and petroleum ethers were tested for the reaction of dimethylaniline borane with ammonia gas. The reactions were carried out in accordance with procedure outlined in Example 1. When the ratio of amine and solvents was kept 1:1, the following results listed were obtained: toluene, a pure product of ammonia borane (see FIGS. 1 to 4); heptane, a pure product (see FIG. 15); xylenes, a pure product of ammonia borane (see FIG. 16); and petroleum ethers, diammoniate diborane impurity was produced and observed in the $^{11}B$ NMR spectrum. (see FIG. 17).

Example 6

Effect of Concentration on the Amine Borane Solution

No or minimal by-product of diammoniate of diborane at any ratio of solvent to the amine borane compound is produced even without toluene as solvent in the reaction system with just dimethylaniline borane reacting with $NH_3$.

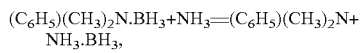

$(C_6H_5)(CH_3)_2N \cdot BH_3 + NH_3 = (C_6H_5)(CH_3)_2N + NH_3 \cdot BH_3,$

However, it is convenient to employ some toluene in the system for the reaction procedure and isolation of product after reaction. Usually, the ratio of dimethylaniline borane and toluene is about 1:1.

However, for the reaction of diethylaniline borane with ammonia:

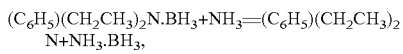

the ratio of diethylaniline borane and toluene can influence the purity of product. See table below that outlines the ratio of diethylaniline to toluene in the reaction, in which DEB stands for diethylaniline borane and Tol for toluene.

TABLE 1 results of reaction of diethylaniline borane with ammonia in toluene.

Figure 18:
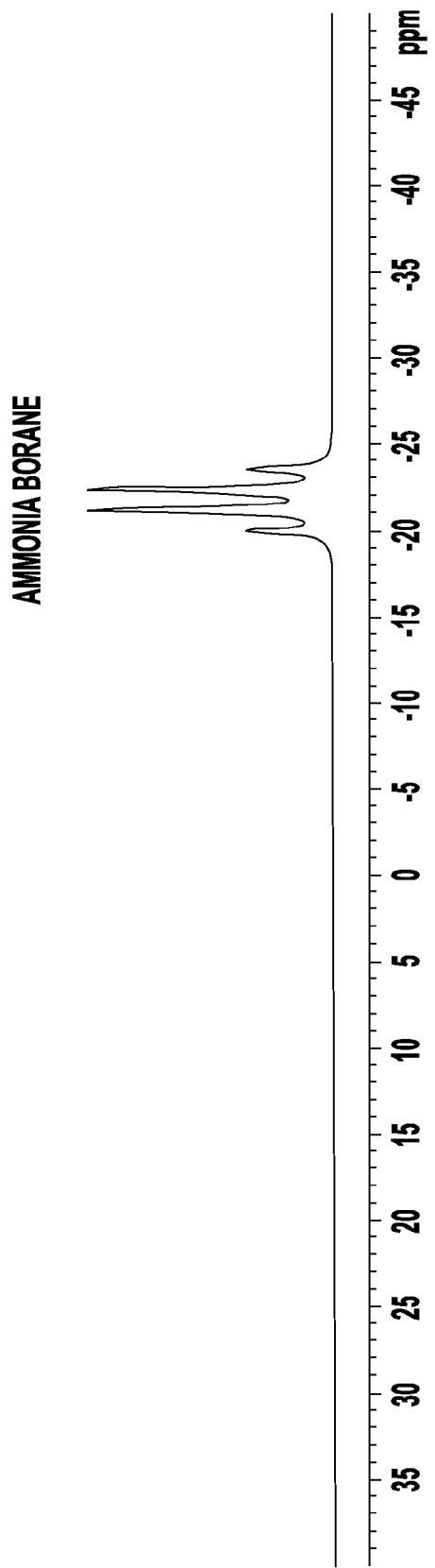
FIG. 18 is a $^{11}$B NMR of ammonia borane prepared using diethylaniline borane (DEB) with a ratio of 2 ml/18 ml (DEB/toluene (TOL))
Figure 19:
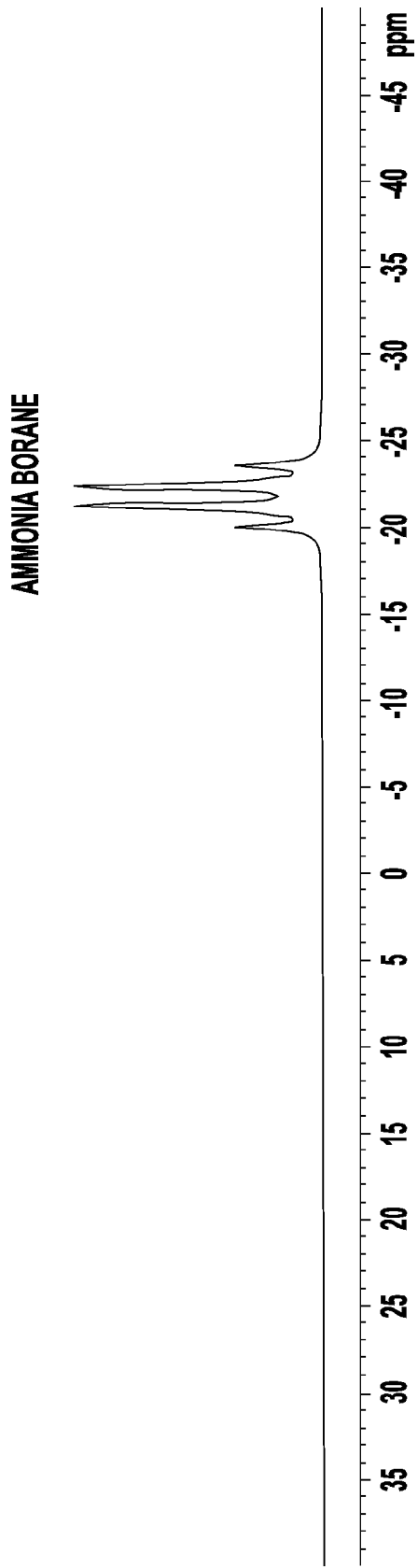
FIG. 19 is a $^{11}$B NMR of ammonia borane prepared using diethylaniline borane with a ratio of 3 ml/17 ml (DEB/TOL)
Figure 20:
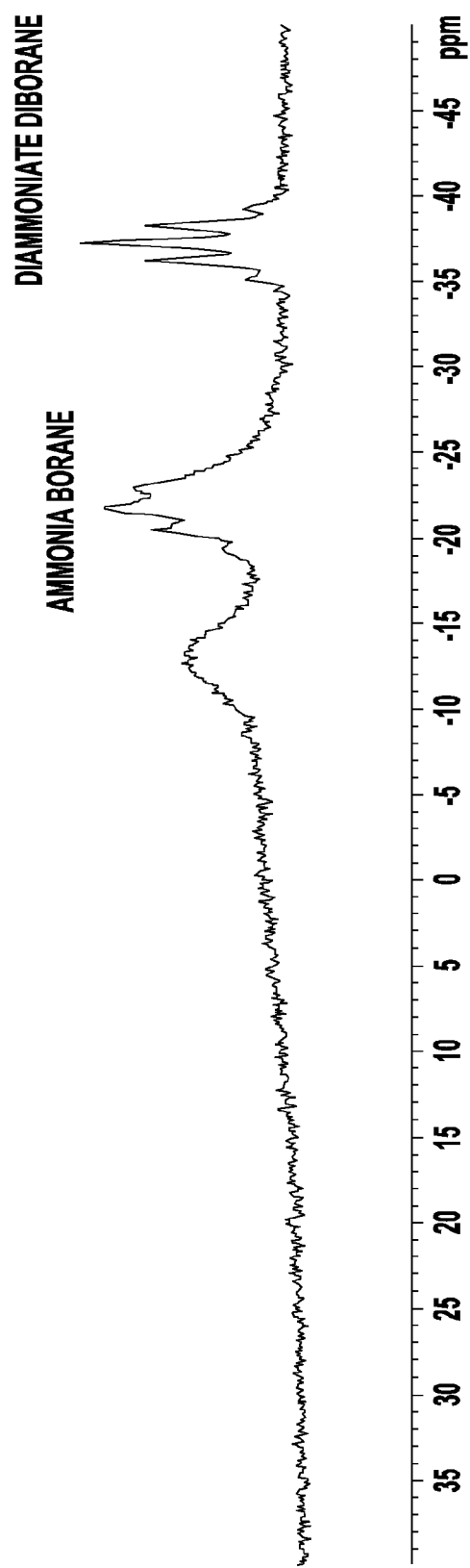
FIG. 20 is a $^{11}$B NMR of ammonia borane prepared using diethylaniline borane with a ratio of 5 ml/15 ml (DEB/TOL)
Figure 21:
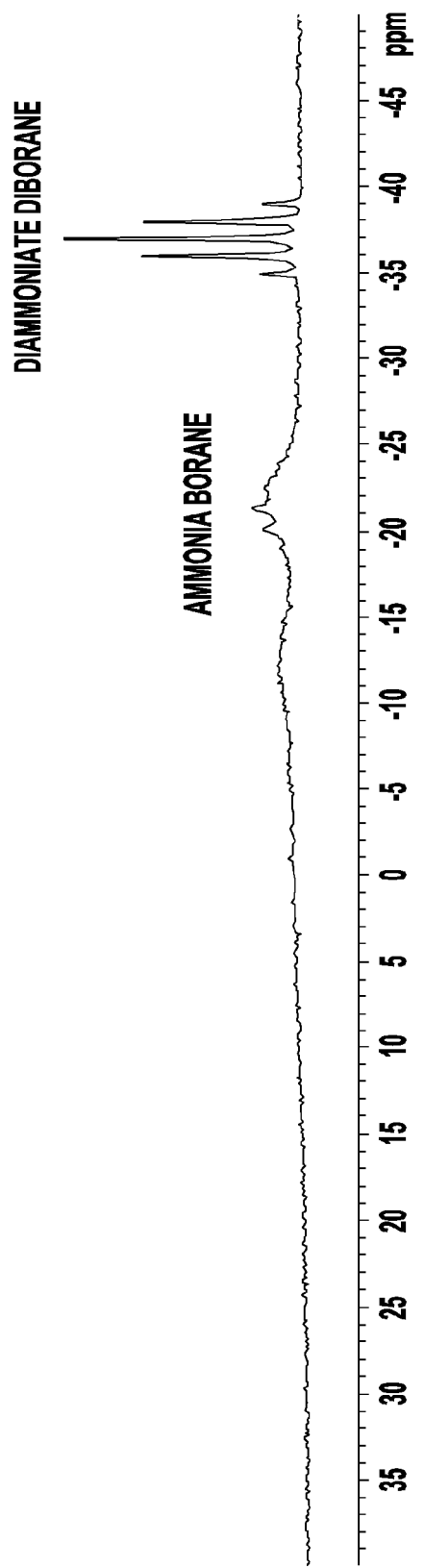
FIG. 21 is a $^{11}$B NMR of ammonia borane prepared using pure diethylaniline borane.

| DEB:Tol | Product |
|---|---|
| 2 ml/18 ml | Pure ammonia borane (FIG. 18) |
| 3 ml/17 ml | Pure ammonia borane (FIG. 19) |
| 5 ml/15 ml | Ammonia borane and diammoniate of diborane (FIG. 20) |
| 5 ml/0 ml | Ammonia borane and diammoniate of diborane (FIG. 21) |

It will be obvious to those skilled in the art that various changes may be made without departing from the scope of the invention, which is not to be considered limited to what is described in the specification.

What is claimed is:

1. A method of synthesizing ammonia borane, comprising reacting at least one amine borane with ammonia gas such that ammonia borane is produced, wherein the amine borane is selected from the group consisting of:

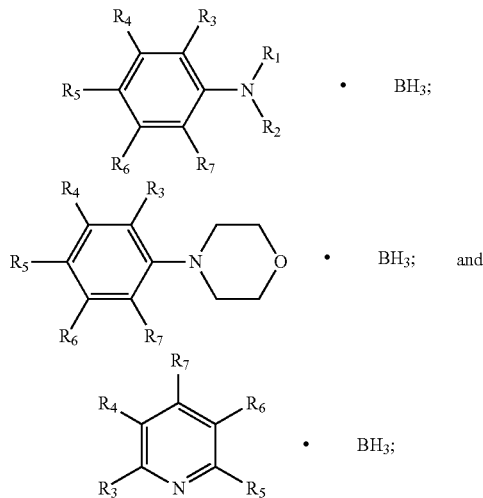

wherein:
$R_1$ and $R_2$ comprise H or a substituted or unsubstituted, saturated or unsaturated, aromatic or nonaromatic $C_1$-$C_{10}$ alkyl;
$R_3$-$R_7$ comprise H, Cl, F, $NO_2$, $OR_8$, or a substituted or unsubstituted, saturated or unsaturated, aromatic or nonaromatic $C_1$-$C_{10}$ alkyl, except that when the amine borane is

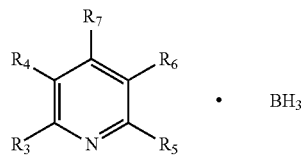

$R_3$-$R_7$ cannot each be H; and
$R_8$ comprises H or a substituted or unsubstituted, saturated or unsaturated, aromatic or nonaromatic $C_1$-$C_{10}$ alkyl.

2. The method as claimed in claim 1 further comprising providing the amine borane in a solvent prior to the step of reacting the amine borane with the ammonia gas.

3. The method as claimed in claim 2, wherein the ratio of the solvent to the amine borane is about 1:1.

4. The method as claimed in claim 2, wherein the solvent is selected from at least one of toluene, heptane, and xylenes.

5. The method as claimed in claim 4, wherein the amine borane is selected from dimethylaniline borane, diethylaniline borane, phenylmorpholine borane, and lutidine borane.

6. The method as claimed in claim 2, wherein the ratio of the solvent to the amine borane is between about 10:1 to 0:1.

7. The method as claimed in claim 1, wherein the ammonia gas is bubbled through the amine borane.

8. The method as claimed in claim 1, wherein the amine borane is selected from the group consisting of aniline borane, N-methylaniline borane, N,N-dimethylaniline borane, N-ethylaniline borane, N,N-diethylaniline borane, N-benzylaniline borane, N,N, dibenzylaniline borane, p-toluidine borane, m-toluidine borane, o-toluidine borane, p-chloroaniline borane, m-chloroaniline borane, o-chloroaniline borane, p-anisidine borane, m-anisidine borane, o-anisidine borane, p-nitroaniline borane, m-nitroaniline borane, o-nitroaniline borane, lutidine borane, p-fluoroaniline borane, m-fluoroaniline borane, o-fluoroaniline borane, 2-chloro-4-aminotoluene borane, diphenylamine borane, N-phenylmorpholine borane, and mixtures of two or more thereof.

9. The method as claimed in claim 8, wherein the amine borane is N,N,-dimethylaniline borane.

10. The method as claimed in claim 2, wherein the step of reacting the at least one borane with the ammonia gas provides a yield of ammonia borane that is greater than about 85 percent.

11. The method as claimed in claim 2, wherein the step of reacting the at least one borane with the ammonia gas provides a yield of ammonia borane that is greater than about 95 percent.

12. A method of synthesizing ammonia borane, comprising reacting at least one amine borane with ammonia gas such that ammonia borane is produced, wherein the amine borane is selected from the group consisting of dimethylaniline borane, diethylaniline borane, phenylmorpholine borane, lutidine borane, and mixtures thereof, and wherein the amine borane is provided in a solvent selected from at least one of toluene, heptane, and xylenes prior to the step of reacting the amine borane with the ammonia gas, and the ammonia gas is bubbled through the solution of the amine borane and the solvent such that ammonia borane is produced.

* * * * *